Nov. 22, 1960

J. E. JONES 2,961,318

SUPERSENSITIZATION OF PHOTOGRAPHIC
EMULSIONS CONTAINING
PLANAR CYANINES

Filed Sept. 30, 1957

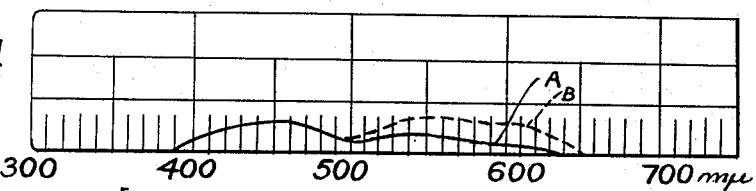

Fig.1

A = 3-ETHYL-5-[(3-ETHYL-2(3H)-BENZOXAZOLYLIDENE) ETHYLIDENE]-
2-[(2-QUINOLYL) METHYLENE]-4- THIAZOLIDINONE (DYE c")
B = DYE c" PLUS A DIAMINOSTILBENE DISULFONATE

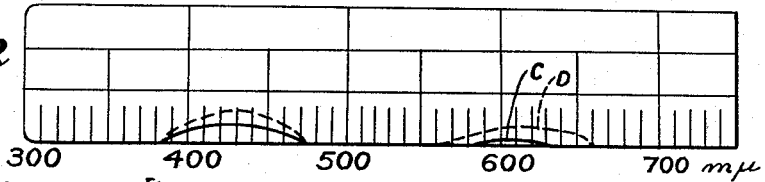

Fig.2

C = 1-PHENYL-5-[(1,3,3-TRIMETHYL-2(3H)-INDOLYLIDENE) ETHYLI-
DENE -2-[3-(1,3,3-TRIMETHYL-2(3H)-INDOLYLIDENE) PROPENYL]-
4,6(1H,5H)- PYRIMIDINEDIONE (DYE m)
D = DYE m PLUS 5-ACETAMIDO -2-(4-STYRYL-3-SULFO)
PHENYL-1,2,3- BENZOTRIAZOLE SODIUM SALT

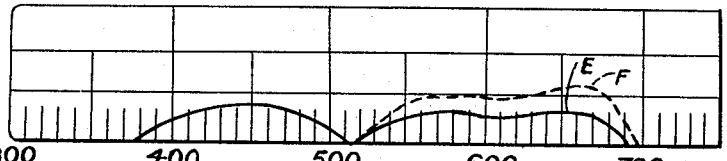

Fig.3

E = 3-[(3-ETHYL-2(3H)- BENZOTHIAZOLYLIDENE) ETHYLIDENE]-
7-(3-METHYL-2(3H)- BENZOTHIAZOLYLIDENE) METHYL]
IMIDAZO [1,2,-a] PYRIDIN-2(3H)-ONE (DYE f')
F = DYE f' PLUS 3,7- BIS (2-PHENYLBENZAMIDO)-
2,8 - DISULFODIBENZOTHIOPHENE-5,5-DIOXIDE
SODIUM SALT

Jean E. Jones
INVENTOR.

BY R. Frank Smith
Lawrence H. Willis
ATTORNEYS

United States Patent Office 2,961,318
Patented Nov. 22, 1960

2,961,318

SUPERSENSITIZATION OF PHOTOGRAPHIC EMULSIONS CONTAINING PLANAR CYANINES

Jean E. Jones, Rochester, N.Y., assignor to Eastman Kodak Company, Rochester, N.Y., a corporation of New Jersey Filed Sept. 30, 1957, Ser. No. 687,285

20 Claims. (Cl. 96—104)

This invention relates to photographic emulsions containing planar, undissociated cyanine dyes, and in supersensitizing combination therewith, certain sulfonated compounds.

It is known in the art of making photographic emulsions that certain dyes of the cyanine class alter the sensitivity of photographic emulsions of the gelatino-silver-halide kind, when the dyes are incorporated in the emulsion. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i.e., increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

I have now found another means of altering the sensitivity in photographic emulsions containing planar cyanine dyes. Since the conditions in the emulsions, i.e., the hydrogen ion and/or silver ion concentrations, undergo little or no change in my method, I shall designate my method as a kind of supersensitization.

It is, therefore, an object of my invention to provide photographic emulsions containing planar dyes and, in supersensitizing combination therewith, certain sulfonated compounds. Another object is to provide methods for making these emulsions. Other objects will become apparent from a consideration of the following description and examples.

The planar, undissociated cyanine dyes useful in practicing my invention can be advantageously represented by the following general formula:

I.

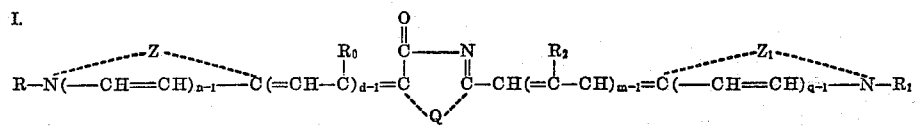

wherein R and $R_1$ each represents an alcohol radical, i.e., an alkyl group (substituted or unsubstituted), such as methyl, ethyl, n-propyl, isopropyl, n-butyl, isobutyl, n-amyl, carboxymethyl, β-carboxyethyl, carbomethoxymethyl, carbethoxymethyl, β-methoxyethyl, vinylmethyl (allyl), phenylmethyl (benzyl), etc., (e.g., an alkyl group of the formula $C_nH_{2n+1}$ wherein $n$ represents a positive integer of from 1 to 4), $R_0$ and $R_2$ each represents a hydrogen atom, a lower alkyl group, such as methyl, ethyl, propyl, etc. (e.g., an alkyl group containing from 1 to 3 carbon atoms), or an aryl group, such as phenyl, tolyl, chlorophenyl, etc., (e.g., a mononuclear aromatic group of the benzene series containing from 6 to 7 carbon atoms), $n$ and $q$ each represents a positive integer of from 1 to 2, $d$ and $m$ each represents a positive integer of from 1 to 3 (when $d$ is 3, $R_0$ is always a hydrogen atom, and when $m$ is 3, $R_2$ is always a hydrogen atom), Q represents an oxygen atom, a divalent sulfur atom, or the non-metallic atoms necessary to complete a diazole ring, e.g., Q is —NR'— wherein R' is an alkyl group, such as methyl, ethyl, propyl, etc. (e.g., an alkyl group containing from 1 to 3 carbon atoms) or an aryl group, such as phenyl, tolyl, etc. (e.g., a mononuclear aromatic group of the benzene series containing from 6 to 7 carbon atoms), or alternatively, Q represents the non-metallic atoms necessary to complete a heterocyclic nucleus containing 6 atoms in the heterocyclic ring (especially where 4 of said atoms are carbon atoms and the remaining atoms are sulfur or nitrogen atoms, e.g., a diazine ring), and Z and $Z_1$ each represents the non-metallic atoms necessary to complete a heterocyclic nucleus containing from 5 to 6 atoms in the heterocyclic ring, such as those of the thiazole series (e.g., thiazole, 4-methylthiazole, 5-methylthiazole, 4-phenylthiazole, 5-phenylthiazole, 4,5-dimethylthiazole, 4,5-diphenylthiazole, 4-(2-thienyl)thiazole, etc.), those of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e.g., α-naphthothiazole (i.e., [2,1]naphthothiazole), β-naphthothiazole (i.e., [1,2]naphthothiazole), 5-methoxy-β-naphthothiazole, 5-ethoxy-β-naphthothiazole, 7-methoxy-α-naphthothiazole, β-methoxy-α-naphthothiazole, etc.), those of the thianaphtheno-7',6',4,5-thiazole series (e.g., 4'-methoxythianaphtheno-7',6',4,5-thiazole, etc.), those of the oxazole series (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e.g., benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 6-chlorobenzoxazole, 5-hydroxybenzoxazole, 6-hydroxybenzoxazole, etc.), those of the naphthoxazole series (e.g., α-naphthoxazole, β-naphthoxazole, etc.), those of the selenazole series (e.g., 4-methylselenazole, 4-phenylselenazole, etc.), those of the benzoselenazole series (e.g., benzoselenazole, 5-chlorobenzoselenazole, 5-methoxybenzoselenazole, 5-hydroxybenzoselenazole, tetrahydrobenzoselenazole, etc.), those of the naphthoselenazole series (e.g., α-naphthoselenazole, β-naphthoselenazole, etc.), those of the thiazoline series (e.g., thiazoline, 4-methylthiazoline, etc.), those of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g., quinoline, 6-methoxyquinoline, 7-methylquinoline, 8-methylquinoline, etc.), those of the 3,3-dialkylindolenine series (e.g., 3,3-dimethylindolenine, 3,3,5-trimethylindolenine, 3,3,7-trimethylindolenine, etc.), those of the 2-pyridine series (e.g., pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e.g., 2-methylpyridine, 3-methylpyridine, 2-chloropyridine, 3-chloropyridine, 2,3-dimethylpyridine, 2,5-dimethylpyridine, 2,6-dimethylpyridine, 2-hydroxypyridine, 3-hydroxypyridine, etc.), etc.

Especially useful planar, undissociated cyanine dyes useful in practicing my invention comprise those dyes represented by the following general formula:

Ia.

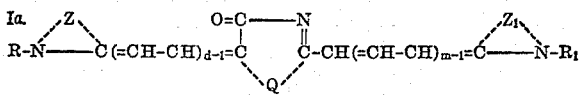

wherein R, $R_1$, d, m, Q, Z and $Z_1$ each have the values given above.

The sulfonated derivatives useful in practicing my invention comprise polynuclear aromatic compounds containing at least one sulfo group. The term "polynuclear aromatic" as used herein is intended to mean 2 or more benzene rings fused together (for example, as in naphthalene, pyrene, etc.) or at least 2 benzene rings or aromatic rings directly joined together (for example, as in diphenyl, terphenyl, quaterphenyl, etc.) or through an aliphatic linkage. Such sulfonated derivatives can conveniently be represented by the following general formula:

II.     $R_3-SO_3M$ wherein $R_3$ represents a polynuclear aromatic group as defined above and M represents a hydrogen atom or a water-soluble cation salt group (e.g., sodium, potassium, ammonium, triethylammonium, triethanolammonium, pyridinium, etc.). Among the most useful of the sulfonated derivatives embraced by Formula II above are the compounds represented by the following general formula:

III.

wherein $B_1$ represents a 2-benzotriazolyl group or a 1,3,5-triazin-6-ylamino group, $B_2$ represents an aromatic group (i.e. benzene or substituted benzene) and M has the values given above.

Typical of the sulfonated derivatives of Formula III above, wherein $B_1$ represents a 1,3,5-triazin-6-ylamino group (i.e., a 1,3,5-triazin-2-ylamino group) are the compounds selected from those represented by the following general formula:

IIIa.

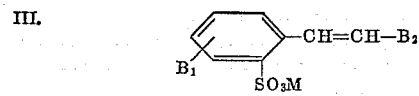

wherein M has the values given above and $R_4$, $R_5$, $R_6$, $R_7$ each represents a hydrogen atom or a substituent group, such as hydroxyl, aryloxyl (e.g., phenoxyl, o-toloxyl, p-sulfophenoxyl, etc.), alkoxyl (e.g., methoxyl, ethoxyl, etc.), a halogen atom (e.g., chlorine, bromine, etc.), a heterocyclic radical (e.g., morpholinyl, piperidyl, etc.), an alkylthio group (e.g., methylthio, ethylthio, etc.), an arylthio group (e.g., phenylthio, tolylthio, etc.), a heterocyclylthio group (e.g., benzothiazylthio, etc.), an amino group, an alkylamino group (e.g., methylamino, ethylamino, propylamino, dimethylamino, diethylamino, dodecylamino, cyclohexylamino, β-hydroxyethylamino, di-β-hydroxyethylamino, β-sulfoethylamino, etc.), an arylamino group (e.g., anilino, o-, m-, and p-sulfoanilino, o-, m-, and p-chloroanilino, o-, m-, and p-anisylamino, o-, m-, and p-toludino, o-, m-, and p-carboxyanilino, hydroxyanilino, sulfonaphthylamino, o-, m-, and p-aminoanilino, p-acetamidoanilino, etc.), etc.

Compounds of Formula IIIa wherein $R_4$, $R_5$, $R_6$ and/or $R_7$ each represents a heterocyclylamino group (e.g., 2-benzothiazoleamino, 2-pyridylamino, etc.) can also be used in practicing my invention.

Another group of sulfonated derivatives which are useful in practicing my invention are those represented by the following general formula:

IV.

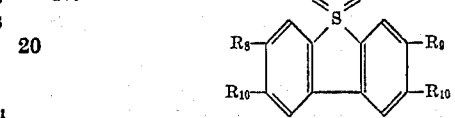

wherein $R_8$ is an acylamido group (e.g., acetamido, sulfobenzamido, 4-methoxy-3-sulfobenzamido, 2-ethoxybenzamido, 2,4-diethoxy, benzamido, p-tolylamido, 4-methyl-2-methoxybenzamido, 1-naphthoylamino, 2-naphthoylamino, 2,4-dimethoxybenzamido, 2-phenylbenzamido, 2-thienylbenzamido) or a sulfo group, $R_9$ represents an acylamido group (e.g., as defined by $R_8$ above), or a sulfoaryl group (e.g., sulfophenyl, p'-sulfodiphenyl, etc.) and $R_{10}$ represents a hydrogen atom or a sulfo group, said compound containing at least one sulfo group.

The planar, undissociated cyanine dyes useful in practicing my invention can be prepared according to the methods described in Heseltine and Brooker U.S. application Serial No. 607,236, filed August 30, 1956, now U.S. Patent 2,927,026, issued March 1, 1960.

Compounds of Formula IIIa which can advantageously be employed in practicing my invention have been described in one or more of the following representative patents:

U.S.:
   2,171,427 _____ August 29, 1939
   2,473,475 _____ June 14, 1949
   2,595,030 _____ April 29, 1952
   2,660,578 _____ November 24, 1953

British:
   595,065 _____ November 26, 1947
   623,849 _____ May 24, 1949
   624,051 _____ May 26, 1949
   624,052 _____ May 26, 1949
   678,291 _____ September 3, 1952
   681,642 _____ October 29, 1952
   705,406 _____ March 10, 1954

The products of Formula IIIa have been previously employed in the textile field, and are sold under such trade names as Leucophor B, Calcofluor White MR, Tinopal (SP, WR, BV277, 2B, GS, NG), Blancofor SC, Hiltamine (BSP, N, Sol., 6T6), and the like.

The preparation of a number of compounds employed by Formula IIIa above has been previously described in the copending application Serial No. 540,052 of B. H. Carroll, J. E. Jones, and J. Spence, filed October 12, 1955, now U.S. Patent 2,945,762, issued July 19, 1960.

The dibenzothiophenedioxide compounds of Formula IV have, in general, been previously described in the prior art. See, for example, U.S. Patents 2,573,652; 2,580,234; and 2,563,493. Further examples of the preparation of such compounds are given in the copending application of J. E. Jones, J. Spence, and J. A. Van Allan, Serial No. 575,160, filed March 30, 1956, now U.S. Patent 2,937,089, issued May 17, 1960. Other examples of sulfonated derivatives embraced by Formula II above which can advantageously be used in my invention can be prepared according to the methods described in application Serial No. 575,160. Other examples of compounds represented by Formula II above which can be used in my invention have been previously described in the copending application of B. H. Carroll, J. E. Jones, and J. Spence, Serial No. 540,054, filed October 12, 1955, now U.S. Patent 2,950,196, issued August 23, 1960. (See, in particular, the compounds of Formulas II, III and IV of that application.)

Compounds selected from those of Formula III above wherein $B_1$ represents a 2-benzotriazolyl group can be prepared according to methods previously described in the prior art. See, for example, U.S. patent to Zweidler et al. 2,713,057, dated July 12, 1955; Keller et al., U.S. Patent 2,684,966, dated July 27, 1954; Zweidler et al., U.S. Patent 2,784,197, dated March 5, 1957; and Keller et al., U.S. Patent 2,784,183, dated March 5, 1957. A somewhat related group of compounds containing a 2-benzotriazolyl group which can be used in my invention have been previously described in U.S. Patent 2,733,165. Such compounds are embraced by Formula II above.

Typical sulfonated derivatives embraced by Formulas II, III, IIIa and IV above are (chemical formulas are given for various types to aid in identification):

(1) A sulfonated triazolostilbene, e.g., of the type shown in U.S. Patent 2,713,057.

(2)
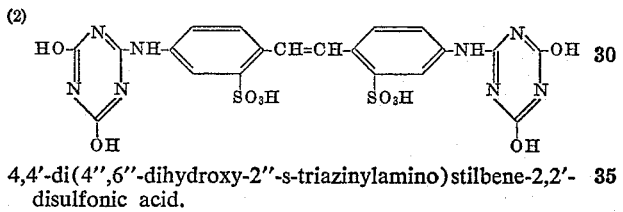
4,4'-di(4'',6''-dihydroxy-2''-s-triazinylamino)stilbene-2,2'-disulfonic acid.

(3)
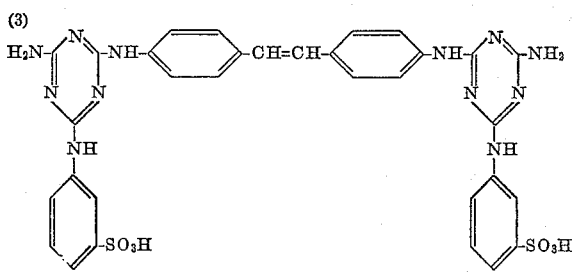
4,4' - bis[4 - (3' - sulfonanilino) - 6 - amino - s - triazin - 2-ylamino]stilbene.

(4) Tinopal–WR, a sulfonated triazinyl stilbene.
(5) Tinopal–2B, a sulfonated triazinyl stilbene.
(6) A sulfonated triazinyl stilbene, e.g., of the type shown in U.S. Patent 2,595,030 or British 595,065.
(7) 4,4'-bis[2-(4-sulfoanilino-2-β - hydroxyethylamino)-1,3,5-triazin-6-ylamino]stilbene-2,2'-disulfonic acid.
(8) 4,4'-bis(2,4-dihydroxy-1,3,5-triazin-6-ylamino)dibenzyl-2,2'-disulfonic acid.
(9) 4,4'bis(2-β-hydroxyethylamino-4-anilino-1,3,5-triazin-6-ylamino)-1,4-distyrylbenzene-2,2'-disulfonic acid.

(10)
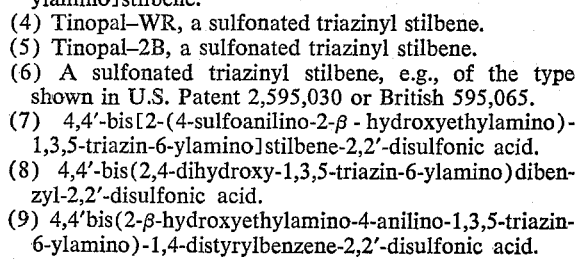
5-methoxy-2-(4-styryl-3-sulfo)phenyl-1,2,3 - benzotriazole sodium salt.
(11) Calcofluor White–MR, a sulfonated triazinyl stilbene.

(12)
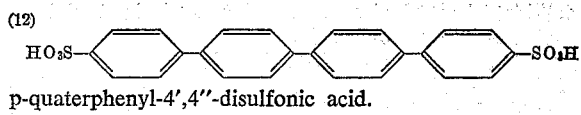
p-quaterphenyl-4',4''-disulfonic acid.

(13)
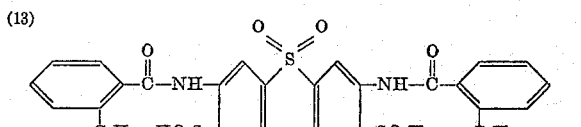
3,7-bis(2-phenylbenzamido)-2,8-disulfodibenzothiophene-5,5-dioxide.
(14) 3,7-bis(2-thienylamido)-2,8-disulfodibenzothiophene dioxide sodium salt.
(15) 3 - [4-(4-methoxy-3-sulfobenzamido)phenyl]-7-(4-methoxy -3- sulfobenzamido)dibenzothiophene dioxide sodium salt.

(16)
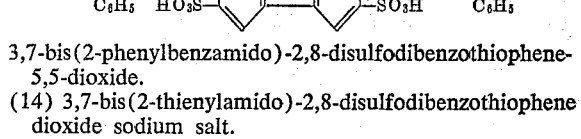
chrysene-6-sulfonic acid sodium salt.

(17)
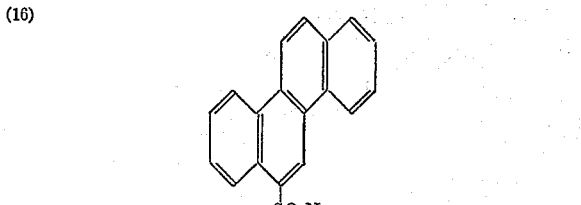
pyrene-3-sulfonic acid sodium salt.
(18) Phenanthrene-3-sulfonic acid sodium salt.
(19) 2,3-dimethylnaphthalene-1-sulfonic acid sodium salt.
(20) 4-[4-phenoxy-6-(β-hydroxyethylamino)-s-triazin-2-ylamino]-4'-[4-chloro-6 - di(β - hydroxyethyl)amino-s-triazin-2-ylamino]stilbene-2,2'-disulfonic acid.

(21)
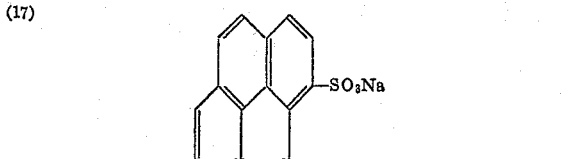
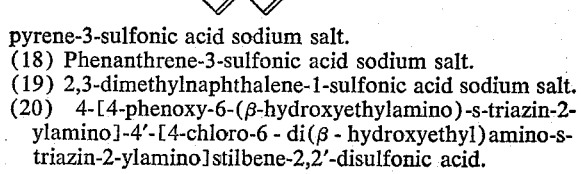
2,8-bis[4-(4-sulfoanilino)-6-hydroxy-s-triazin-2-ylamino]-carbazole.

(22)
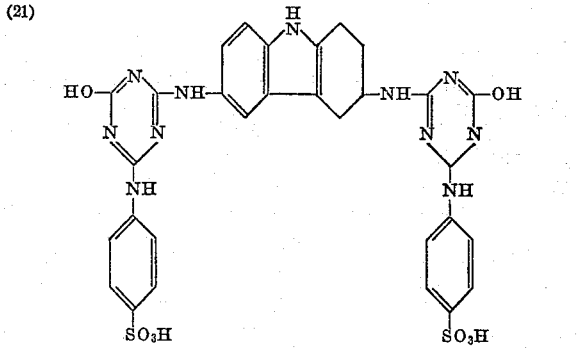
2-(3-sulfoanilino)-6-hydroxy-4-(β-hydroxyethyl)amino-s-triazine.

(23)
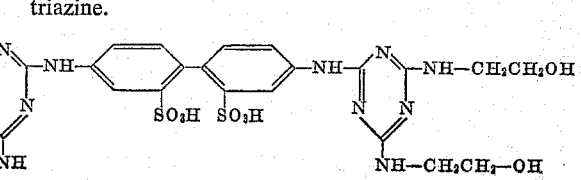

4,4'-bis(4,6-di(β-hydroxyethylamino)-s-triazin-2-yl)benzidine-2,2'-disulfonic acid.
(24) 2-laurylamino-4,6-di(4-sulfoanilino)-s-triazine.
(25) 4,4'-bis{4-[4'-(N'-4''-sulfobenzyl-N'-ethyl)amino-anilino]-6-hydroxy-s-triazin-2-ylamino}stilbene-2,2'-disulfonic acid.
(26) 5-acetamido-2-(4-styryl-3-sulfo)phenyl-1,2,3-benzotriazole sodium salt.
(27) 2,7-diacetamido-3,6-disulfodibenzothiophene-5,5-dioxide sodium salt.

(28)

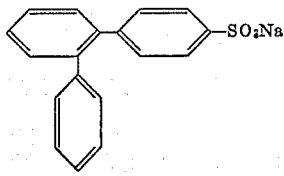

4-sulfo-o-terphenyl sodium salt. (Jour. Organ. Chem., vol. 14 (1949), pg. 163.)

(29)

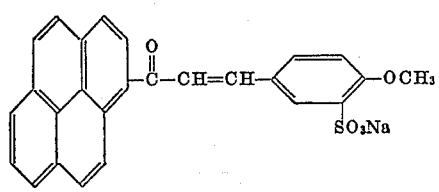

pyrene-3-(4-methoxy-3-sulfostyryl)ketone sodium salt.
(30) 3,7-bis(4-methyl-2-methoxybenzamido)-2,8-disulfodibenzothiophene-5,5-dioxide sodium salt.

As can be seen above, many of the sulfonated derivatives are employed in the form of their water-soluble salts, such as alkali metal (e.g., sodium, potassium, etc.) salts, or ammonium or amine (e.g., triethylamine, triethanolamine, pyridine, aniline, etc.) salts. By thus using these derivatives, they can be added to the emulsions in substantially neutral aqueous solutions without disturbing the pH of the emulsions.

According to my invention, I incorporate one or more of the planar dyes selected from those represented by Formula I (or Ia) above with one or more of the sulfonated derivatives of the type described above in a photographic emulsion. My invention is particularly directed to the ordinarily employed gelatino-silver-halide emulsions. However, my supersensitizing combinations can be employed in silver halide emulsions in which the carrier is other than gelatin, e.g., a resinous substance or cellulose material which has no deteriorating effect on the silver halides.

The planar dyes and sulfonated derivatives can be employed in various concentrations depending upon the effects desired. As is well known in the art, the sensitivity conferred upon an emulsion by a sensitizing dye does not increase proportionately to the concentration of the dye in the emulsion, but rather passes through a maximum as the concentration is increased. In practicing my invention, the planar dyes are advantageously employed in a concentration approximating their optimum concentration (i.e., the concentration at which the dye gives greatest sensitivity). In general, the sulfonated derivatives employed in my invention have little or no sensitizing action in the emulsions employed.

The optimum concentration of an individual sensitizing dye can be determined in a manner well known to those skilled in the art by measuring the sensitivity of a series of test portions of the same emulsion, each portion containing a different portion of the sensitizing dye. The optimum concentration of the planar dyes used in my invention can, of course, be readily determined in the same manner by measuring the sensitivity of a series of test portions of the emulsion, each portion containing a different concentration of the planar dye to be used in the combination. In determining the optimum concentration for the supersensitizing combination, it is advantageous to employ at first a concentration of the planar dye less than its optimum concentration, and then gradually increase the concentration of the dye until its optimum concentration is determined.

Ordinarily, the optimum or near optimum concentration of the planar dyes useful in practicing my invention is of the order of from 0.02 to 0.3 g. per mole of silver halide in the emulsion.

The sulfonated derivatives useful in practicing my invention can advantageously be employed in concentrations on the order of from 0.02 to 10.0 g. per mole of silver halide in the emulsion.

Generally speaking, the ratio of concentration of the complex cyanine dye to the sulfonated derivative can vary rather widely in my combinations, e.g., from 1:100 to 1:1 (by weight) in many instances.

The methods of incorporating sensitizing dyes in emulsions are well known to those skilled in the art, and as mentioned above, the sulfonated derivatives of my invention can be incorporated in the emulsions conveniently in substantially neutral aqueous solution. In practicing my invention, the planar dyes and sulfonated derivatives can be incorporated in the emulsions separately or together. Frequently, it is convenient to add the planar dyes and sulfonated derivatives separately in the form of solutions in appropriate solvents. Methanol, ethanol, pyridine, etc., have proven satisfactory as solvents for the planar dyes which I employ in my invention, although acetone has also been found to be satisfactory in certain cases. If desired, a mixture of solvents, such as methanol and pyridine, can be employed. The planar dyes and sulfonated derivatives can be added to the emulsions in any given order. The planar dyes and sulfonated derivatives are advantageously incorporated in the finished, washed emulsions and should be uniformly distributed throughout the emulsions. The following procedure is satisfactory: Stock solutions of the dyes and sulfonated derivatives desired are prepared by dissolving the same in appropriate solvents as described above. Then, to the flowable gelatino-silver-halide emulsion, the desired amounts of the stock solution of one of the dyes (or sulfonated derivatives) is slowly added, while stirring the emulsion. Stirring is continued until the dye is thoroughly incorporated in the emulsion. Then, the desired amount of the stock solution of the sulfonated derivative (or dye, if sulfonated derivative has been added first) is slowly added to the emulsion, while stirring. Stirring is continued until the second ingredient is thoroughly incorporated. The supersensitized emulsion can then be coated out on a suitable support, such as glass, cellulose derivative film, resin film, or paper, to a suitable thickness and allowed to dry. The details of such coating methods are well known to those skilled in the art.

The amounts of the planar dyes and sulfonated derivatives actually incorporated in the emulsion will vary somewhat from case to case, according to the emulsion employed and according to the effect desired. The regulation and adoption of the most economical and useful proportions will be apparent to those skilled in the art upon making the ordinary observations and tests customarily employed in the art. Accordingly, the foregoing procedures and proportions are to be regarded only as illustrative. Clearly, my invention is directed to any emulsion containing a combination of the aforesaid planar dyes and sulfonated derivatives whereby a supersensitizing effect is obtained.

My invention is primarily directed to the ordinarily employed gelatino-silver-halide developing-out emulsions, e.g., gelatino-silver-chloride, -chlorobromide, -chloroiodide, -chlorobromiodide, -bromide and -bromiodide developing-out emulsions. While the results in the following table were obtained using gelatino-silver-bromiodide emulsions, excellent results have also been obtained using gelatino-silver-chlorobromide emulsions. Emulsions which form the latent image mostly inside the silver halide grains, such as the emulsions set forth in U.S. Patent 2,456,956, dated December 21, 1948, can also be employed in practicing my invention.

Photographic silver halide emulsions, such as those listed above, containing the supersensitizing combinations of my invention can also contain such addenda as chemical sensitizers, e.g., sulfur sensitizers (e.g., allyl thiocarbamide, thiourea, allylisothiocyanate, cystine, etc.), various gold compounds (e.g. potassium chloroaurate, auric trichloride, etc.) (see U.S. Patents 2,540,085; 2,597,856; and 2,597,915), various palladium compounds, such as palladium chloride (U.S. 2,540,086), potassium chloropalladate (U.S. 2,598,079), etc., or mixtures of such sensitizers; antifoggants, such as ammonium chloroplatinate (U.S. 2,566,245), ammonium chloroplatinite (U.S. 2,566,263), benzotriazole, nitrobenzimidazole, 5-nitroindazole, benzidine, mercaptans, etc. (see Mees, "The Theory of the Photographic Process," Macmillan Pub., 1942, page 460), or mixtures thereof; hardeners, such as formaldehyde (U.S. 1,763,533), chrome alum (U.S. 1,763,533), glyoxal (U.S. 1,870,354), dibromacrolein (Br. 406,750), etc.; color couplers, such as those described in U.S. Patent 2,423,730, Spence and Carroll U.S. Patent 2,640,776, issued June 2, 1953, etc.; or mixtures of such addenda. Dispersing agents for color couplers, such as those set forth in U.S. Patents 2,322,027 and 2,304,940, can also be employed in the above-described emulsions.

Another group of planar dyes which can advantageously be employed in supersensitizing combination with the sulfonated derivatives of my invention include the dyes represented by the following general formula:

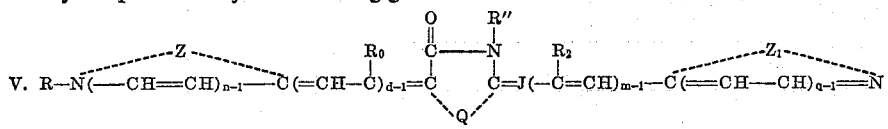

$$V.\ R-N(-CH=CH)_{n-1}-C(=CH-C)_{d-1}=C\underset{Q}{\overset{R_0}{\diagdown}}\overset{\overset{O}{\|}\ \ \overset{R''}{|}}{C-N}\underset{Q}{\overset{R_2}{\diagup}}C=J(-C=CH)_{m-1}-C(=CH-CH)_{q-1}=N$$

wherein $R$, $n$, $d$, $m$, $q$, $Q$, $Z$, $R_0$, $R_2$ and $Z_1$ each have the values given above, $R''$ represents an alkyl group, such as methyl, ethyl, n-propyl, vinylmethyl (allyl), etc., and J represents a nitrogen atom or a methine group. These planar dyes can advantageously be prepared by heating in the presence of an alkali, or organic amine, complex cyanine dyes (which have $R_1$—X attached to the nitrogen atom of the heterocyclic nucleus defined by $Z_1$). This method is well known to those skilled in the art and is illustrated in several of the examples below. Particularly useful planar dyes embraced by Formula V are those dyes represented by the following general formula:

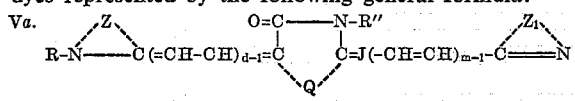

$$Va.\ R-N\underset{Q}{\overset{Z}{\diagdown}}C(=CH-CH)_{d-1}=\overset{O=C-N-R''}{C}\ \ C=J(-CH=CH)_{m-1}-C\underset{Q}{\overset{Z_1}{\diagup}}N$$

wherein $R$, $R''$, $d$, $m$, $J$, $Q$, $Z$ and $Z_1$ each have the values given above. Especially useful dyes represented by Formulas I, Ia, V or Va are those dyes wherein $d$ and $m$ represent a positive integer of from 1 to 2, and more particularly where either $d$ or $m$ is 2. In some instances, dyes, where both $d$ and $m$ represent 1, do not provide the unique effects illustrated below for dyes wherein $d$ or $m$ is 2.

The following examples will serve to illustrate further the manner of practicing my invention. To different portions of the same batch of photographic gelatino-silver-bromiodide emulsion were added (1) a planar dye of Formulas I, Ia, V or Va and (2) a combination of the planar dye and a sulfonated derivative as described above. Before coating, the emulsions containing the addenda were digested for a short time (about 10 minutes) in a tank maintained at approximately 50° C. The different portions of emulsion were then coated on conventional supports (glass or cellulose ester film) and exposed in the usual manner in a spectograph and Eastman Type Ib Sensitometer through a Wratten No. 12 Filter, i.e., a filter which transmits substantially no light of wavelengths shorter than about 495 m$\mu$ (except for about 1% between 300 and 340 m$\mu$). The exposed coatings were then processed for 3 minutes in a developer having the following composition:

| | G. |
|---|---|
| N-methyl-p-aminophenolsulfate | 2.0 |
| Hydroquinone | 8.0 |
| Sodium sulfite (anhydrous) | 90.0 |
| Sodium carbonate (monohydrate) | 52.5 |
| Potassium bromide | 5.0 |
| Water to make one liter. | |

As mentioned aobve, no data showing the sensitometric properties of the sulfonated derivatives alone are given, since it has been found that these derivatives have little or no sensitizing action on the emulsion used. Different emulsions were used in some of the examples, although the emulsions of each individual example were obtained from the same batch. The minus blue speed, gamma and fog for each of the coatings are given in Table A below. The speed figure used is represented by the formula $100(1-\log E)$ where E represents the exposure in meter candles seconds required to provide a density of 0.3 above fog. It is to be noted that differences in speed are quite significant, since a difference of 30 units represents a speed difference of 100% (i.e., $\log^{-1} .30$ is 2). The speed figures for the dyes alone have been adjusted to be 100 for purposes of comparison with the speeds for the supersensitized coatings, i.e., the speeds are relative.

TABLE A

| Example | Addenda (g./mol. AgX) | Minus-Blue Light Exposure | | |
|---|---|---|---|---|
| | | Rel. Speed | Gamma | Fog |
| 1 | (a) 2-[(3-ethyl-2(3H)-benzoxazolylidene)propenyl]-5-[(3-ethyl-2(3H)-benzoxazolylidene)ethylidene]thiazolin-4-one (.08). | 100 | 3.7 | .05 |
| | (b) dye (a) (.08) plus compound 11 (1.0) | 135 | 2.9 | .10 |
| 2 | (c) dye (a) (.08) plus compound 10 (1.0) | 141 | 3.3 | .10 |
| 3 | (d) 3-[(3-ethyl-2(3H)-benzoxazolylidene)ethylidene]-7-[(3-ethyl-2(3H)-benzoxazolylidene)propenyl]imidazo[1,2-a]pyridin-2(3H)-one hydroiodide (.08). | 100 | 5.2 | .15 |
| | (e) dye (d) (.08) plus compound 10 (1.0) | 130 | 5.0 | .15 |
| 4 | (f) 7-[(3-ethyl-2(3H)-benzothiazolylidene)propenyl]-3-(3-methyl-2(3H)-benzothiazolylidene)imidazo[1,2-a]pyridin-2(3H)-one hydroiodide (.08). | 100 | .83 | .35 |
| | (g) dye (f) (.08) plus compound 30 (0.5) | 173 | 4.8 | .07 |
| 5 | (h) 3-[(3-ethyl-2(3H)-benzoxazolylidene)ethylidene]-7-[(3-methyl-2(3H)-benzoxazolylidene)methyl]imidazo[1,2-a]pyridin-2(3H)-one hydroiodide (.08). | 100 | 5.9 | .08 |
| | (i) dye (h) (.08) plus compound 13 (0.5) | 138 | 5.5 | .12 |
| 6 | (j) 3-ethyl-5-[(3-ethyl-2(3H)-benzoxazolylidene)ethylidene-2-[5-(3-ethyl-2(3H)-benzoxazolylidene)ethylidene-4-oxo-2-thiazolinyl]-methenyl-4-thiazolidinone (.08). | 100 | 3.4 | .12 |
| | (k) dye (j) (.08) plus compound 10 (0.5) | 118 | 4.8 | .08 |
| 7 | (l) 5-[(3-ethyl-2(3H)-benzothiazolylidene)ethylidene]-2-[(3-ethyl-2(3H)-benzothiazolylidene)methyl]-2-thiazolin-4-one (.08). | 100 | 4.8 | .12 |
| | (m) dye (l) (.08) plus compound 30 (0.5) | 122 | 5.5 | .12 |

In exactly the manner described above, the data in Table B below were obtained. The only difference between the manner of recording the data is with respect to the speed figures, which are not on a relative basis as in the case of the data of Table A. The coatings of Examples 8–12 were obtained from the same batch of emulsion; the coatings of Examples 13–14 were obtained from the same batch of emulsion; the coatings of Examples 24 and 25 were obtained from the same batch of emulsion, and the coatings of Examples 27–30 were obtained from the same batch of emulsion.

idene) - ethylidene] - 2 - methylmercapto - 2 - thiazolin-4-one etho-p-toluene sulfonate and 1.4 g. of quinaldine was heated over a free flame for about 1 minute. The cool reaction mixture was stirred with 10 ml. of acetone. After chilling, the solid was collected on a filter and washed with acetone. The residue was suspended in 25 ml. of hot methyl alcohol and treated with an excess of triethylamine. The suspension was chilled, and the dye was collected on a filter and washed with methyl alcohol. The yield of dye was 48% crude and 25% after two recrystallizations from methyl alcohol. The red crystals

TABLE B

| Example | Addenda (g./mol. AgX) | Minus-Blue Light Exposure | | |
|---|---|---|---|---|
| | | Speed | Gamma | Fog |
| 8 | (n) 1-phenyl-5-[(1,3,3-trimethyl-2(3H)-indolylidene)ethylidene]-2-[3-(1,3,3-trimethyl-2(3H)-indolylidene)propenyl]-4,6(1H,5H)-pyrimidinedione (.08). | 6 | 1.4 | .05 |
| | (o) dye (n) (.08) plus compound 26 (.05) | 55 | 3.3 | .03 |
| 9 | (p) dye (n) (.08) plus compound 10 (.05) | 52 | 3.1 | .07 |
| 10 | (q) dye (n) (.08) plus compound 27 (.05) | 55 | 3.0 | .10 |
| 11 | (r) dye (n) (.08) plus compound 13 (.05) | 57 | 2.9 | .10 |
| 12 | (s) dye (n) (.08) plus compound 15 (.05) | 22 | 2.4 | .06 |
| 13 | (t) 5-[(3-ethyl-2(3H)-benzoxazolylidene)ethylidene]-2-[3-(3-ethyl-2(3H)-benzoxazolylidene)propenyl]-1-phenyl-4,6(1H,5H)-pyrimidinedione (.08). | 45 | 2.8 | .06 |
| | (u) dye (t) (.08) plus compound 26 (.05) | 80 | 3.1 | .08 |
| 14 | (v) dye (t) (.08) plus compound 27 (.05) | 83 | 3.0 | .13 |
| 15 | (w) 5-[(3-ethyl-2(3H)-benzothiazolylidene)ethylidene]-2-[3-(3-ethyl-2(3H)-benzothiazolylidene)propenyl-1-phenyl-4,6(1H,5H)-pyrimidinedione (.08). | 24 | 2.2 | .08 |
| 16 | (x) dye (w) (.08) plus compound 10 (.05) | 83 | 3.2 | .09 |
| | (y) dye (w) (.08) plus compound 15 (.05) | 68 | 3.1 | .06 |
| 17 | (z) 5-[(1-ethyl-2(1H)-quinolylidene)ethylidene]-2-[3-(1-ethyl-2(1H)-quinolylidene)propenyl]-1-phenyl-4,6(1H,5H)-pyrimidinedione hydroiodide (.08). | −18 | 1.0 | .08 |
| | (a′) dye (z) (.08) plus compound 10 (.05) | 77 | 3.6 | .08 |
| 18 | (b′) 3-[(3-ethyl-2(3H)-benzothiazolylidene)ethylidene]-7-[(3-ethyl-2(3H)-benzothiazolylidene)propenyl]imidazo[1,2-a]pyridin-2(3H)-one hydroiodide (.08). | 45 | 2.8 | .10 |
| | (c′) dye (b′) (.08) plus compound 13 (.05) | 67 | 3.0 | .10 |
| 19 | (d′) 3-(3-methyl-2(3H)-benzothiazolylidene)-7-[(3-methyl-2(3H)-benzothiazolylidene)methyl]imidazo[1,2-a]pyridin-2(3H)-one hydroiodide (.08). | 66 | 3.2 | .04 |
| | (e′) dye (d′) (.08) plus compound 26 (.05) | 83 | 2.9 | .03 |
| 20 | (f′) 3-[(3-ethyl-2(3H)-benzothiazolylidene)ethylidene]-7-[(3-methyl-2(3H)-benzothiazolylidene)methyl]imidazo[1,2-a]pyridin-2(3H)-one hydroiodide (.08). | 69 | 3.4 | .05 |
| | (g′) dye (f′) (.08) plus compound 13 (.05) | 108 | 3.6 | .05 |
| 21 | (h′) 7-[(3-ethyl-2(3H)-benzoxazolylidene)propenyl]-3-(3-methyl-2(3H)-benzoxazolylidene)imidazo[1,2-a]pyridin-2(3H)-one hydroiodide (.08). | 80 | 3.4 | .06 |
| | (i′) dye (h′) (.08) plus compound 13 (.05) | 98 | 3.6 | .05 |
| 22 | (j′) 7-[(3-ethyl-2(3H)-benzothiazolylidene)propenyl]-3-(3-methyl-2(3H)-benzothiazolylidene)imidazo[1,2-a]pyridin-2(3H)-one hydroiodide (.08). | 34 | 2.0 | .15 |
| | (k′) dye (j′) (.08) plus compound 10 (.05) | 74 | 2.7 | .06 |
| 23 | (l′) 5-[(3-ethyl-2(3H)-benzothiazolylidene)ethylidene]-2-[(1-ethyl-2(1H)-naphtho[1,2]thiazolylidene)methyl]-2-thiazolin-4-one (.08). | 101 | 2.9 | .04 |
| | (m′) dye (l′) (.08) plus compound 10 (.05) | 118 | 2.9 | .04 |
| 24 | (n′) 5-[(3-ethyl-2(3H)-benzothiazolylidene)ethylidene]-2-[(1-ethyl-2(1H)-quinolylidene)methyl]-2-thiazolin-4-one (.08). | 54 | 2.6 | .05 |
| 25 | (o′) dye (n′) (.08) plus compound 10 (.0F) | 77 | 2.6 | .05 |
| | (p′) dye (n′) (.08) plus compound 11 (.05) | 72 | 2.5 | .04 |
| 26 | (q′) 5-(3-ethyl-2(3H)-benzothiazolylidene)-2-[(3-ethyl-2(3H)-benzothiazolylidene)propenyl]thiazolin-4-one (.08). | 100 | 2.5 | .05 |
| | (r′) dye (q′) (.08) plus compound 11 (.05) | 109 | 2.5 | .05 |
| 27 | (s′) 2-[(3-ethyl-2(3H)-benzothiazolylidene)propenyl]-5-[(3-ethyl-2(3H)-benzothiazolylidene)ethylidene]thiazolin-4-one (.08). | <−22 | | .05 |
| | (t′) dye (s′) (.08) plus compound 10 (.05) | 52 | 2.2 | .04 |
| 28 | (u′) dye (a) (.08) | 5 | 2.7 | .05 |
| | (v′) dye (a) (.08) plus compound 16 (0.64) | 27 | 2.2 | .04 |
| 29 | (w′) dye (a) (.08) plus compound 28 (0.64) | 26 | 2.4 | .05 |
| 30 | (x′) dye (a) (.08) plus compound 29 (0.64) | 47 | 1.8 | .03 |
| 31 | (y′) 2-[(2-benzoxazolyl)imino]-3-ethyl-5-[(3-ethyl-2(3H)-benzoxazolylidene)-ethylidene]-4-thiazolidinone (.08). | −22 | | .03 |
| | (z′) dye (y′) (.08) plus compound 11 (0.05) | 56 | 2.6 | .03 |
| 32 | (a″) 3-ethyl-5-[(3-ethyl-2(3H)-benzoxazolylidene)ethylidene]-2-[(4-quinolyl)methenyl]-4-thiazolidinone (.08). | 30 | 2.2 | .03 |
| | (b″) dye (a″) (.08) plus compound 11 (.05) | 57 | 2.1 | .03 |
| 33 | (c″) 3-ethyl-5-[(3-ethyl-2(3H)-benzoxazolylidene)ethylidene]-2-[(2-quinolyl)methenyl]-4-thiazolidinone (.05). | 37 | 2.7 | .04 |
| | (d″) dye (c″) (.08) plus compound 11 (.05) | 53 | 2.1 | .03 |

As indicated above, the dyes represented by Formula I can be prepared according to the method described in copending application 607,236. The following examples will illustrate the method of making dyes represented by Formula V above.

*Example A.* — *3-ethyl-5-[(3-ethyl-2(3H)-benzoxazolylidene)ethylidene] - 2 - (2 - quinolylmethylene) - 4 - thiazolidinone (dye c″)*

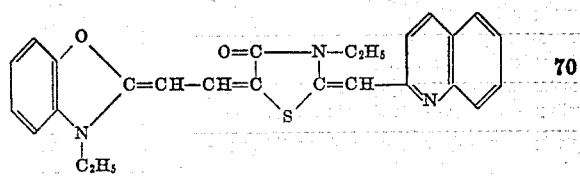

A mixture of 2.6 g. of 5-[(3-ethyl-2(3H)-benzoxazolylwith a green reflex melted at 240–242° C. with decomposition.

*Example B.* — *3-ethyl-5-[(3-ethyl-2(3H)-benzoxazolylidene)ethylidene] - 2 - (4 - quinolylmethylene) - 4 - thiazolidinone (dye a″)*

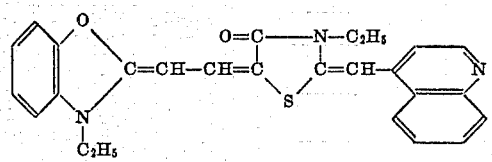

A mixture of 2.6 g. of 5-[(3-ethyl-2(3H)-benzoxazolylidene) - ethylidene] - 2 - methylmercapto - 2 - thiazolin-4-one etho-p-toluenesulfonate and 1.43 g. of lepidine was heated over a free flame for about 1 minute. The cool reaction mixture was stirred with 10 ml. of acetone.

After chilling, the solid was collected on a filter and washed with acetone. The residue was suspended in 15 ml. of hot methyl alcohol and treated with an excess of triethylamine. The suspension was chilled and the dye was collected on a filter and washed with methyl alcohol. The yield of dye was 12% crude and 7% after two recrystallizations from methyl alcohol. The reddish crystals melted at 212–213° C. with decomposition.

*Example C.*—*2 - (2 - benzoxazolylimino) - 3 - ethyl - 5- [(3 - ethyl - 2(3H) - benzoxazolylidene)ethylidene]- 4-thiazolidinone (dye y')*

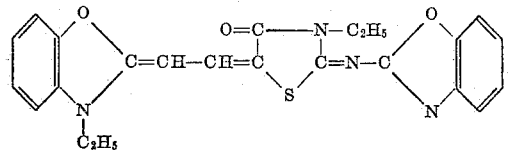

A mixture of 1.2 g. of 5-[(3-ethyl-2(3H)-benzoxazolylidene) - ethylidene] - 2 - methylmercapto - 2 - thiazolin-4-one etho-p-toluene sulfonate, 0.34 g. of 2-aminobenzoxazole, 0.25 g. of triethylamine and 20 ml. of anhydrous ethyl alcohol was heated, with shaking, at the refluxing temperature for 5 minutes. The reaction mixture was chilled and the solid was collected on a filter and washed with methyl alcohol. The yield of dye was 37% crude and 5% after three recrystallizations from methyl alcohol. The orange crystals melted at 253–254° C. with decomposition.

Listed below are the melting points of several of the dyes of my invention, which were obtained according to the method described in application Serial No. 607,236.

| Dye | Melting Point, ° C. with decomposition |
| --- | --- |
| b' | 163–165 |
| f' | 285–287 |
| d' | 219–220 |
| h' | 226–228 |
| t | 220–221 |
| w | 258–259 |
| a | 248–250 |
| r' | 255–257 |
| n' | 278–280 |

While it is to be understood that several of the dyes of my invention were added to the silver halide emulsions in the form of their acid addition salts, it is well known that such dyes do not exist in the emulsions in the form of their acid addition salts, rather they exist in the dye form, such as is illustrated by Formula I above. It is, therefore, to be understood that the formulas in the foregoing specification and in the following claims, contemplate the addition to the emulsions of either the free dyes or their acid addition salts.

The term sulfo as used in the foregoing specification and in the following claims means the free sulfonic acid group, as well as water-soluble salts of this group, such as sodium, potassium, ammonium, organic ammonium, etc.

The accompanying drawing illustrates the supersensitizing effect obtained with three of my new combinations of dyes in an ordinary gelatino-silver-bromiodide emulsion. Each figure of the drawing is a diagrammatic reproduction of two spectrograms. In each figure, the sensitivity of the emulsion containing only the complex dye of Formula I or Ia is illustrated by the solid curve. The uppermost curve (broken line), represents the sensitivity conferred upon the emulsion by a combination of the dye of Formula I or Ia and a sulfo compound, such as one from the group represented by those of Formula II. No curve representing the effect on the emulsion of the sulfo compound alone is given, inasmuch as it has been found that these have little or no measurable effect on the sensitivity of ordinary silver halide emulsions.

In Figure 1, curve A represents the sensitivity of an ordinary gelatino-silver-bromiodide emulsion sensitized with 3 - ethyl - 5 - [(3 - ethyl - 2(3H) - benzoxazolylidene)ethylidene] - 2 - [(2 - quinolyl)methylene] - 4-thiazolidinone while curve B represents the sensitivity of the same emulsion containing 3-ethyl-5-[(3-ethyl-2(3H) - benzoxazolylidene)ethylidene] - 2 - [(2 - quinolyl)methylene]-4-thiazolidinone, and a diaminostilbene-disulfonate, such as Calcofluor White–MR. The sensitometric characteristics of these coatings are given in Example 33 of the above table.

In Figure 2, curve C represents the sensitivity of an ordinary gelatino-silver-bromiodide emulsion sensitized with 1 - phenyl - 5 - [(1,3,3 - trimethyl - 2(3H) - indolylidene)ethylidene] - 2 - [3 - (1,3,3 - trimethyl - 2(3H)-indolylidene)propenyl] - 4,6(1H,5H) - pyrimidinedione while curve D represents the sensitivity of the same emulsion sensitized with 1-phenyl-5-[(1,3,3-trimethyl-2(3H)-indolylidene)ethylidene] - 2 - [3 - (1,3,3 - trimethyl-2(3H) - indolylidene)propenyl] - 4,6(1H,5H) - pyrimidinedione and 5 - acetamido - 2 - (4 - styryl - 3 -sulfo) phenyl-1,2,3-benzotriazole sodium salt. The sensitometric measurements for these emulsions are given in Example 8 of the above table.

In Figure 3, curve E represents the sensitivity of an ordinary gelatino-silver-bromiodide emulsion sensitized with 3 - [(3 - ethyl - 2(3H) - benzothiazolylidene)ethylidene] - 7 - [(3 - methyl - 2(3H) - benzothiazolylidene) methyl]imidazo[1,2,a]pyridin - 2(3H) - one while curve F represents the sensitivity of the same emulsion sensitized with 3 - [(3 -ethyl - 2(3H) - benzothiazolylidene) ethylidene] - 7 - [(3 - methyl - 2(3H) - benzothiazolylidene)methyl]imidazo[1,2-a]pyridin - 2(3H) - one and 3,7 - bis(2 - phenylbenzamido) - 2,8 -disulfodibenzothiophene-5,5-dioxide sodium salt. The sensitometric measurements for these emulsions are given in Example 20 of the above table.

What I claim as my invention and desire secured by Letters Patent of the United States is:

1. A photographic silver halide emulsion sensitized with a supersensitizing combination of (a) at least one planar, undissociated dye selected from those represented by the following general formula:

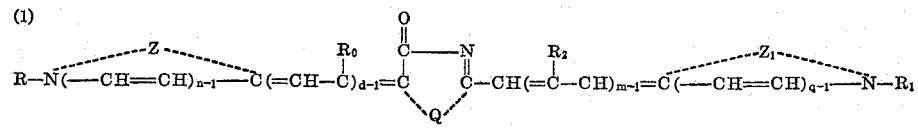

wherein R and $R_1$ each represents an alkyl group, $R_0$ and $R_2$ each represents a member selected from the group consisting of a hydrogen atom, a lower alkyl group, and an aryl group, n, d, m and q each represents a positive integer of from 1 to 2, Q represents a member selected from the group consisting of an oxygen atom, a divalent sulfur atom, the non-metallic atoms necessary to complete a diazole ring, and the non-metallic atoms necessary to complete a diazine ring, and Z and $Z_1$ each represents the non-metallic atoms necessary to complete a heterocyclic nucleus selected from the group consisting of those of the thiazole series, those of the benzothiazole series, those of the naphthothiazole series, those of the benzoxazole series, those of the naphthoxazole series, those of the benzoselenazole series, those of the naphthoselenazole series, those of the 2-quinoline series, those of the 4-quinoline series, and those of the 3,3-dialkylindolenine series, and (b) at least one water-soluble compound, containing at least one sulfo group, selected from the class consisting of (A) a carbocyclic compound selected from those represented by the following general formula:

(2)            D—SO$_3$H wherein D represents an aromatic group comprising an aromatic ring selected from the class consisting of a biphenyl ring, a terphenyl ring, a quaterphenyl ring, and an aromatic group containing at least two benzene rings fused together, (B) a water-soluble salt of a compound represented by said Formula 2, (C) a dibenzothiophene dioxide compound selected from those represented by the following general formula:

(3)
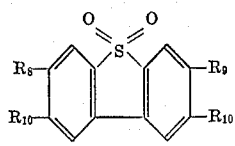

wherein $R_8$ represents a member selected from the group consisting of acylamido group and a sulfo group, $R_9$ represents a member selected from the group consisting of an acylamido group and a sulfoaryl group, and $R_{10}$ represents a member selected from the group consisting of a hydrogen atom and a sulfo group, said Compound 3 containing at least one sulfo group, and (D) a compound selected from those represented by the following general formula:

(4)
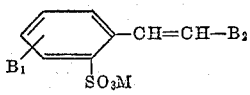

wherein $B_1$ represents a member selected from the group consisting of a 2-benzotriazolyl group and a 1,3,5-triazin-6-ylamino group, $B_2$ represents an aromatic group, and M represents a member selected from the group consisting of a hydrogen atom and an alkali metal atom.

2. A photographic gelatino-silver-halide developing-out emulsion sensitized with a supersensitizing combination of (a) at least one planar, undissociated dye selected from those represented by the following general formula:

(1)
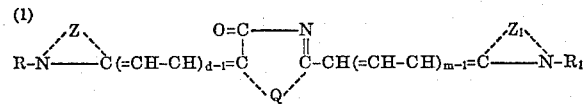

wherein R and $R_1$ each represents an alkyl group containing from 1 to 2 carbon atoms, d and m each represents a positive integer of 1 to 2, provided that both d and m do not simultaneously represent 1, Q represents a member selected from the group consisting of an oxygen atom, a divalent sulfur atom, the non-metallic atoms necessary to complete an imidazo[1,2-a]pyridin-(2,3H)-one nucleus and the non-metallic atoms necessary to complete a pyrimidinedione nucleus, and Z and $Z_1$ each represents the nonmetallic atoms necessary to complete a heterocyclic nucleus selected from the group consisting of those of the thiazole series, those of the benzothiazole series, those of the benzoxazole series, those of the naphthoxazole series, those of the benzoselenazole series, those of the 2-quinoline series, and those of the 3,3-dialkylindolenine series, and (b) at least one water-soluble compound, containing at least one sulfo group, selected from the class consisting of (A) a carbocyclic compound selected from those represented by the following general formula:

(2)            D—SO$_3$H wherein D represents an aromatic group comprising an aromatic ring selected from the class consisting of a biphenyl ring, a terphenyl ring, a quaterphenyl ring, and an aromatic group containing at least two benzene rings fused together, (B) a water-soluble salt of a compound represented by said Formula 2, (C) a dibenzothiophene dioxide compound selected from those represented by the following general formula:

(3)
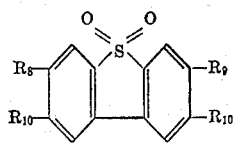

wherein $R_8$ represents a member selected from the group consisting of an acylamido group and a sulfo group, $R_9$ represents a member selected from the group consisting of an acylamido group and a sulfoaryl group, and $R_{10}$ represents a member selected from the group consisting of a hydrogen atom and a sulfo group, said Compound 3 containing at least one sulfo group, and (D) a compound selected from those represented by the following general formula:

(4)
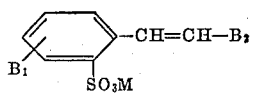

wherein $B_1$ represents a member selected from the group consisting of a 2-benzotriazolyl group and a 1,3,5-triazin-6-ylamino group, $B_2$ represents an aromatic group, and M represents a member selected from the group consisting of a hydrogen atom and an alkali metal atom.

3. A photographic emulsion as defined in claim 2 wherein the silver halide is silver bromiodide.

4. A photographic gelatino-silver-halide developing-out emulsion sensitized with a supersensitizing combination of (a) at least one planar, undissociated dye selected from those represented by the following general formula:

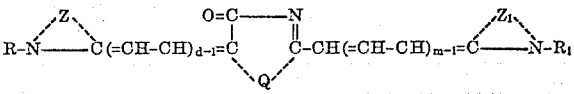

wherein R and $R_1$ each represents an alkyl group containing from 1 to 2 carbon atoms, d and m each represents a positive integer of from 1 to 2, provided that both d and m do not simultaneously represent 1, Q represents a member selected from the group consisting of an oxygen atom, a divalent sulfur atom, the nonmetallic atoms necessary to complete an imidazo[1,2-a]pyridin-(2,3H)-one nucleus and the non-metallic atoms necessary to complete a pyrimidinedione nucleus, and Z and $Z_1$ each represents the nonmetallic atoms necessary to complete a heterocyclic nucleus selected from the group consisting of those of the thiazole series, those of the benzothiazole series, those of the benzoxazole series, those of the naphthoxazole series, those of the benzoselenazole series, those of the 2-quinoline series, and those of the 3,3-dialkylindolenine series, and (b) at least one water-soluble compound selected from those represented by the following general formula:

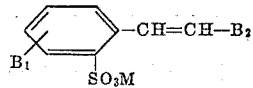

wherein $B_1$ represents a member selected from the group consisting of a 2-benzotriazolyl group and a 1,3,5-triazin-6-ylamino group, $B_2$ represents an aromatic group, and M represents a member selected from the group consisting of a hydrogen atom and an alkali metal atom.

5. A photographic gelatino-silver-halide developing-out emulsion sensitized with a supersensitizing combination of (a) at least one planar, undissociated dye selected from those represented by the following general formula:

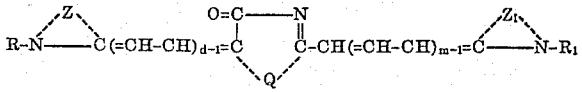

wherein R and $R_1$ each represents an alkyl group containing from 1 to 2 carbon atoms, d and m each represents a positive integer of from 1 to 2, provided that both $d$ and $m$ do not simultaneously represent 1, Q represents a member selected from the group consisting of an oxygen atom, a divalent sulfur atom, the nonmetallic atoms necessary to complete an imidazo[1,2-a]pyridin-(2,3H)-one nucleus and the non-metallic atoms necessary to complete a pyrimidinedione nucleus, and Z and $Z_1$ each represents the nonmetallic atoms necessary to complete a heterocyclic nucleus selected from the group consisting of those of the thiazone series, those of the benzothiazole series, those of the benzoxazole series, those of the naphthoxazole series, those of the benzoselenazole series, those of the 2-quinoline series, and those of the 3,3-dialkylindolenine series, and (b) at least one water-soluble compound selected from those represented by the following general formula:

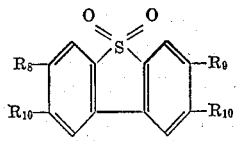

wherein $R_8$ represents a member selected from the group consisting of an acylamido group and a sulfo group, $R_9$ represents a member selected from the group consisting of an acylamido group and a sulfoaryl group, and $R_{10}$ represents a member selected from the group consisting of a hydrogen atom and a sulfo group, said Compound $b$ containing at least one sulfo group.

6. A photographic silver halide emulsion sensitized with a supersensitizing combination of (a) at least one planar, undissociated dye selected from those represented by the following general formula:

(1)
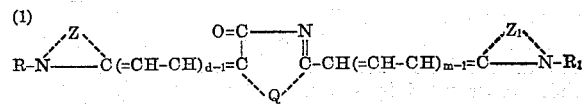

wherein R and $R_1$ each represents an alkyl group containing from 1 to 2 carbon atoms, $d$ and $m$ each represents a positive integer of from 1 to 2, provided that both $d$ and $m$ do not simultaneously represent 1, Q represents a member selected from the group consisting of an oxygen atom, a divalent sulfur atom, the nonmetallic atoms necessary to complete an imidazo[1,2-a]pyridin-(2,3H)-one nucleus, and the non-metallic atoms necessary to complete a pyrimidinedione nucleus, and Z and $Z_1$ each represents the non-metallic atoms necessary to complete a heterocyclic nucleus of the benzothiazole series, and (b) at least one water-soluble compound, containing at least one sulfo group, selected from the class consisting of (A) a carbocyclic compound selected from those represented by the following general formula:

(2) 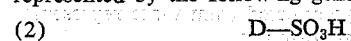

wherein D represents an aromatic group comprising an aromatic ring selected from the class consisting of a biphenyl ring, a terphenyl ring, a quaterphenyl ring, and an aromatic group containing at least two benzene rings fused together, (B) a water-soluble salt of a compound represented by said Formula 2, (C) a dibenzothiophene dioxide compound selected from those represented by the following general formula:

(3)
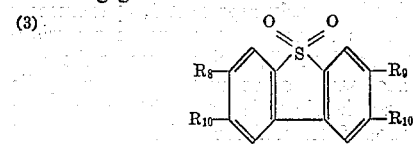

wherein $R_8$ represents a member selected from the group consisting of an acylamido group and a sulfo group, $R_9$ represents a member selected from the group consisting of an acylamido group and a sulfoaryl group, and $R_{10}$ represents a member selected from the group consisting of a hydrogen atom and a sulfo group, said Compound 3 containing at least one sulfo group, and (D) a compound selected from those represented by the following general formula:

(4)
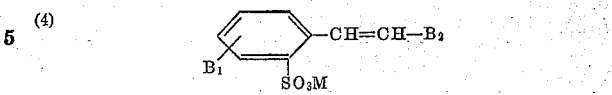

wherein $B_1$ represents a member selected from the group consisting of a 2-benzotriazolyl group and a 1,3,5-triazin-6-ylamino group, $B_2$ represents an aromatic group, and M represents a member selected from the group consisting of a hydrogen atom and an alkali metal atom.

7. A photographic silver halide emulsion sensitized with a supersensitizing combination of (a) at least one planar, undissociated dye selected from those represented by the following general formula:

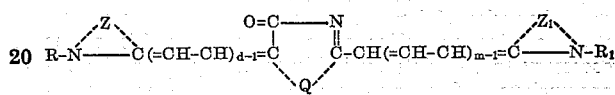

wherein R and $R_1$ each represents an alkyl group containing from 1 to 2 carbon atoms, $d$ and $m$ each represents a positive integer of from 1 to 2, provided that both $d$ and $m$ do not simultaneously represent 1, Q represents a member selected from the group consisting of an oxygen atom, a divalent sulfur atom, the non-metallic atoms necessary to complete an imidazo[1,2-a]pyridin-(2,3H)-one nucleus, and the non-metallic atoms necessary to complete a pyrimidinedione nucleus, and Z and $Z_1$ each represents the non-metallic atoms necessary to complete a heterocyclic nucleus of the benzothiazole series, and (b) at least one water-soluble compound selected from those represented by the following general formula:

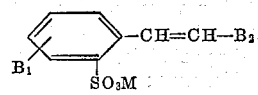

wherein $B_1$ represents a member selected from the group consisting of a 2-benzotriazolyl group and a 1,3,5-triazin-6-ylamino group, $B_2$ represents an aromatic group, and M represents a member selected from the group consisting of a hydrogen atom and an alkali metal atom.

8. A photographic silver halide emulsion sensitized with a supersensitizing combination of (a) at least one planar, undissociated dye selected from those represented by the following general formula:

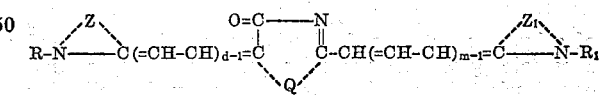

wherein R and $R_1$ each represents an alkyl group containing from 1 to 2 carbon atoms, $d$ and $m$ each represents a positive integer of from 1 to 2, provided that both $d$ and $m$ do not simultaneously represent 1, Q represents a member selected from the group consisting of an oxygen atom, a divalent sulfur atom, the non-metallic atoms necessary to complete an imidazo[1,2-a]pyridin-(2,3H)-one nucleus, and the non-metallic atoms necessary to complete a pyrimidinedione nucleus, and Z and $Z_1$ each represents the non-metallic atoms necessary to complete a heterocyclic nucleus of the benzothiazole series, and (b) at least one water-soluble compound selected from those represented by the following general formula:

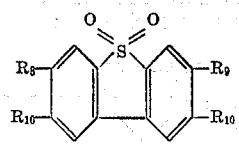

wherein $R_8$ represents a member selected from the group consisting of an acylamido group and a sulfo group, $R_9$ represents a member selected from the group consisting of an acylamido group and a sulfoaryl group, and $R_{10}$ represents a member selected from the group consisting of a hydrogen atom and a sulfo group, said Compound b containing at least one sulfo group.

9. A photographic silver halide emulsion sensitized with a supersensitizing combination of (a) at least one planar, undissociated dye selected from those represented by the following general formula:

(1)
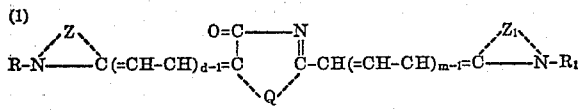

wherein R and $R_1$ each represents an alkyl group containing from 1 to 2 carbon atoms, d and m each represents a positive integer of from 1 to 2, provided that both d and m do not simultaneously represent 1, Q represents a member selected from the group consisting of an oxygen atom, a divalent sulfur atom, the non-metallic atoms necessary to complete an imidazo[1,2-a]pyridin-(2,3H)-one nucleus, and the non-metallic atoms necessary to complete a pyrimidinedione nucleus, and Z and $Z_1$ each represents the non-metallic atoms necessary to complete a heterocyclic nucleus of the 2-quinoline series, and (b) at least one water-soluble compound, containing at least one sulfo group, selected from the class consisting of (A) a carbocyclic compound selected from those represented by the following general formula:

(2)     D—SO$_3$H wherein D represents an aromatic group comprising an aromatic ring selected from the class consisting of a biphenyl ring, a terphenyl ring, a quaterphenyl ring, and an aromatic group containing at least two benzene rings fused together, (B) a water-soluble salt of a compound represented by said Formula 2, (C) a dibenzothiophene dioxide compound selected from those represented by the following general formula:

(3)
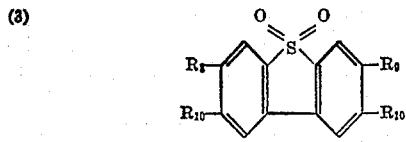

wherein $R_8$ represents a member selected from the group consisting of an acylamido group and a sulfo group, $R_9$ represents a member selected from the group consisting of an acylamido group and a sulfoaryl group, and $R_{10}$ represents a member selected from the group consisting of a hydrogen atom and a sulfo group, said Compound 3 containing at least one sulfo group, and (D) a compound selected from those represented by the following general formula:

(4)
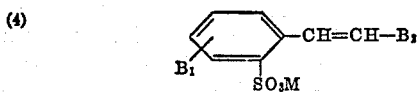

wherein $B_1$ represents a member selected from the group consisting of a 2-benzotriazolyl group and a 1,3,5-triazin-6-ylamino group, $B_2$ represents an aromatic group, and M represents a member selected from the group consisting of a hydrogen atom and an alkali metal atom.

10. A photographic silver halide emulsion sensitized with a supersensitizing combination of (a) at least one planar, undissociated dye selected from those represented by the following general formula:

(1)
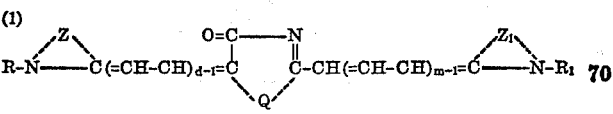

wherein R and $R_1$ each represents an alkyl group containing from 1 to 2 carbon atoms, d and m each represents a positive integer of from 1 to 2, provided that both d and m do not simultaneously represent 1, Q represents a member selected from the group consisting of an oxygen atom, a divalent sulfur atom, the non-metallic atoms necessary to complete an imidazo[1,2-a]pyridin-(2,3H)-one nucleus, and the non-metallic atoms necessary to complete a pyrimidinedione nucleus, and Z and $Z_1$ each represents the non-metallic atoms necessary to complete a heterocyclic nucleus of the 2-quinoline series, and (b) at least one water-soluble compound selected from those represented by the following general formula:

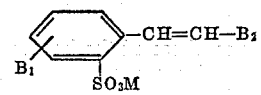

wherein $B_1$ represents a member selected from the group consisting of a 2-benzotriazolyl group and a 1,3,5-triazin-6-ylamino group, $B_2$ represents an aromatic group, and M represents a member selected from the group consisting of a hydrogen atom and an alkali metal atom.

11. A photographic silver halide emulsion sensitized with a supersensitizing combination of (a) at least one planar, undissociated dye selected from those represented by the following general formula;

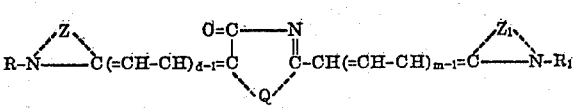

wherein R and $R_1$ each represents an alkali group containing from 1 to to carbon atoms, d and m each represents a positive integer of from 1 to 2, provided both d and m do not simultaneously represent 1, Q represents the non-metallic atoms necessary to complete an imidazo[1,2-a]pyridin-(2,3H)-one nucleus, and Z and $Z_1$ each represents the non-metallic atoms necessary to complete a heterocyclic nucleus of the benzothiazole series, and (b) at least one water-soluble compound selected from those represented by the following general formula:

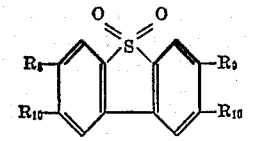

wherein $R_8$ represent a member selected from the group consisting of an acylamido group and a sulfo group, $R_9$ represents a member selected from the group consisting of an acylamido group and a sulfoaryl group, and $R_{10}$ represents a member selected from the group consisting of a hydrogen atom and a sulfo group, said compound (b) containing at least one sulfo group.

12. A photographic silver halide emulsion sensitized with a supersensitizing combination of (a) at least one planar, undissociated dye selected from those represented by the following general formula:

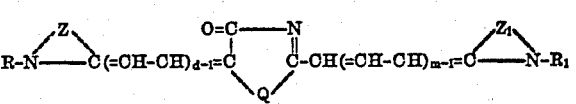

wherein R and $R_1$ each represents an alkyl group containing from 1 to 2 carbon atoms, d and m each represents a positive integer of from 1 to 2, provided both d and m do not simultaneously represent 1, Q represents the non-metallic atoms necessary to complete a pyrimidinedione nucleus, and Z and $Z_1$ each represents the non-metallic atoms necessary to complete a heterocyclic nucleus of the benzothiazole series, and (b) at least one water-soluble compound selected from those represented by the following general formula:

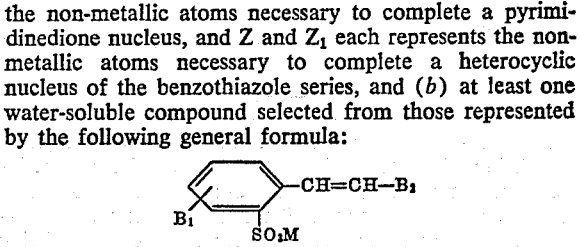

wherein $B_1$ represents a member selected from the group consisting of a 2-benzotriazolyl group and a 1,3,5-triazin- 6-ylamino group, $B_2$ represents an aromatic group, and M represents a member selected from the group consisting of a hydrogen atom and an alkali metal atom.

13. A photographic silver halide emulsion sensitized with a supersensitizing combination of (a) at least one planar, undissociated dye selected from those represented by the following general formula:

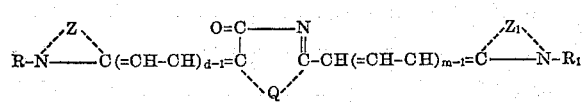

wherein R and $R_1$ each represents an alkyl group containing from 1 to 2 carbon atoms, d and m each represents a positive integer of from 1 to 2, provided both d and m do not simultaneously represent 1, Q represents the non-metallic atoms necessary to complete a pyrimidinedione nucleus, and Z and $Z_1$ each represents the non-metallic atoms necessary to complete a heterocyclic nucleus of the 2-quinoline series, and (b) at least one water-soluble compound selected from those represented by the following general formula:

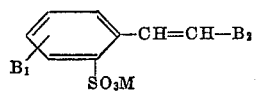

wherein $B_1$ represents a member selected from the group (1)

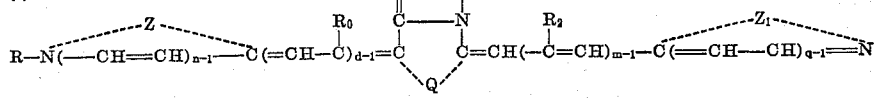

consisting of a 2-benzotriazolyl group and a 1,3,5-triazin-6-ylamino group, $B_2$ represents an aromatic group, and M represents a member selected from the group consisting of a hydrogen atom and an alkali metal atom.

14. A photographic silver halide emulsion sensitized with a supersensitizing combination of (a) at least one planar, undissociated dye selected from those represented by the following general formula:

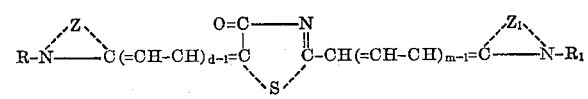

wherein R and $R_1$ each represents an alkyl group containing from 1 to 2 carbon atoms, d and m each represents a positive integer of from 1 to 2, provided that both d and m do not simultaneously represent 1, and Z and $Z_1$ each represents the non-metallic atoms necessary to complete a heterocyclic nucleus of the benzothiazole series, and (b) at least one water-soluble compound selected from those represented by the following general formula:

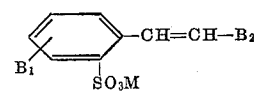

wherein $B_1$ represents a member selected from the group consisting of a 2-benzotriazolyl group and a 1,3,5-triazin-6-ylamino group, $B_2$ represents an aromatic group, and M represents a member selected from the group consisting of a hydrogen atom and an alkali metal atom.

15. A photographic silver halide emulsion sensitized with a supersensitizing combination comprising 7-[(3-ethyl - 2(3H) - benzothiazolylidene)propenyl] - 3 - (3-methyl-2(3H)-benzothiazolylidene)imidazo[1,2 - a]pyridin-2(3H)-one hydroiodide and 3,7-bis(4-methyl-2-methoxybenzamido) - 2,8 - disulfodibenzothiophene - 5,5-dioxide sodium salt.

16. A photographic silver halide emulsion sensitized with a supersensitizing combination comprising 5-[(3- ethyl - 2(3H) - benzothiazolylidene)ethylidene]-2-[3-(3-ethyl - 2(3H) - benzothiazolylidene)propenyl - 1 - phenyl-4,6(1H,5H)-pyrimidinedione and 5-methoxy-2-(4-styryl-3-sulfo)phenyl-1,2,3-benzotriazole sodium salt.

17. A photographic silver halide emulsion sensitized with a supersensitizing combination comprising 5-[(1-ethyl - 2(1H) - quinolylidene)ethylidene]-2-[3-(1-ethyl-2(1H) - quinolylidene)propenyl]-1-phenyl - 4,6(1H,5H)-pyrimidinedione hydroiodide and 5-methoxy-2-(4-styryl-3-sulfo)phenyl-1,2,3-benzotriazole sodium salt.

18. A photographic silver halide emulsion sensitized with a supersensitizing combination comprising 3-[(3-ethyl - 2(3H) - benzothiazolylidene)ethylidene] - 7 - [(3-methyl - 2(3H) - benzothiazolylidene)methyl]imidazo-[1,2-a]pyridin-2(3H)-one hydroiodide and 3,7-bis(2-phenylbenzamido)-2,8-disulfodibenzothiophene - 5,5 - dioxide.

19. A photographic silver halide emulsion sensitized with a supersensitizing combination comprising 2-[(3-ethyl - 2(3H) - benzothiazolylidene)propenyl] - 5 - [(3-ethyl - 2(3H) - benzothiazolylidene)ethylidene]thiazolin-4-one and 5-methoxy-2-(4-styryl-3-sulfo)phenyl - 1,2,3-benzotriazole sodium salt.

20. A photographic silver halide emulsion sensitized with a supersensitizing combination of (a) at least one planar, undissociated dye selected from those represented by the following general formula:

wherein R and R″ each represents an alkyl group, $R_0$ and $R_2$ each represents a member selected from the group consisting of a hydrogen atom, a lower alkyl group, and an aryl group, n, d, m and q each represents a positive integer of from 1 to 2, Q represents a member selected from the group consisting of an oxygen atom, a divalent sulfur atom, the non-metallic atoms necessary to complete a diazole ring, and the non-metallic atoms necessary to complete a diazine ring, and Z and $Z_1$ each represents the non-metallic atoms necessary to complete a heterocyclic nucleus selected from the group consisting of those of the thiazole series, those of the benzothiazole series, those of the naphthothiazole series, those of the benzoxazole series, those of the naphthoxazole series, those of the benzoselenazole series, those of the naphthoselenazole series, those of the 2-quinoline series, those of the 4-quinoline series, and those of the 3,3-dialkylindolenine series, and (b) at lease one water-soluble compound, containing at least one sulfo group, selected from the class consisting of (A) a carbocyclic compound selected from those represented by the following general formula:

(2)   $D—SO_3H$ wherein D represents an aromatic group comprising an aromatic ring selected from the class consisting of a biphenyl ring, a terphenyl ring, a quaterphenyl ring, and an aromatic group containing at least two benzene rings fused together, (B) a water-soluble salt of a compound represented by said Formula 2, (C) a dibenzothiophene dioxide compound selected from those represented by the following general formula:

(3)

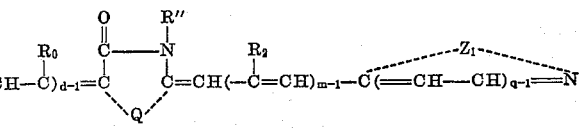

wherein $R_8$ represents a member selected from the group consisting of an acylamido group and a sulfo group, $R_9$ represents a member selected from the group consisting of an acylamido group and a sulfoaryl group, and $R_{10}$ represents a member selected from the group consisting of a hydrogen atom and a sulfo group, said Compound 3 containing at least one sulfo group, and (D) a compound selected from those represented by the following general formula:

(4) 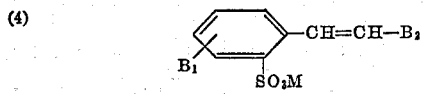

wherein $B_1$ represents a member selected from the group consisting of a 2-benzotriazolyl group and a 1,3,5-triazin-6-ylamino group, $B_2$ represents an aromatic group, and M represents a member selected from the group consisting of a hydrogen atom and an alkali metal atom.

References Cited in the file of this patent

UNITED STATES PATENTS

| | | |
|---|---|---|
| 1,315,324 | Mutscheller | Sept. 9, 1919 |
| 2,186,717 | Eggert et al. | Jan. 9, 1940 |
| 2,454,629 | Brooker | Nov. 23, 1948 |
| 2,490,572 | Anish | Dec. 6, 1949 |
| 2,534,050 | Murray | Dec. 12, 1950 |
| 2,718,466 | Wolfson | Sept. 20, 1955 |

FOREIGN PATENTS

| | | |
|---|---|---|
| 857,886 | Germany | Dec. 4, 1952 |

OTHER REFERENCES

Clerc: "Photography Theory and Practice," 3rd ed., p. 235, Pitman Pub. Corp., New York, 1954.

UNITED STATES PATENT OFFICE
CERTIFICATION OF CORRECTION

Patent No. 2,961,318                      November 22, 1960

Jean E. Jones

It is hereby certified that error appears in the above numbered patent requiring correction and that the said Letters Patent should read as corrected below.

Column 10, line 39, for "aobve" read -- above --; column 20, line 28, for "alkali" read -- alkyl --; line 29, for "from 1 to to" read -- from 1 to 2 --; line 44, for "represent" read -- represents --.

Signed and sealed this 20th day of June 1961.

(SEAL)
Attest:

ERNEST W. SWIDER
Attesting Officer

DAVID L. LADD
Commissioner of Patents